United States Patent
Shao et al.

(10) Patent No.: US 11,803,813 B2
(45) Date of Patent: Oct. 31, 2023

(54) METHODS AND SYSTEMS FOR CONSOLIDATING PROFILES FOR JOINT APPLICATION DETERMINATION

(71) Applicant: Capital One Services, LLC, McLean, VA (US)

(72) Inventors: Ruoyu Shao, Allen, TX (US); John Lujano, Dallas, TX (US); Jacky Kwok, Allen, TX (US); Kurt Wolf, Frisco, TX (US); Sang Jin Park, Allen, TX (US); Heng Gu, Millbrae, CA (US)

(73) Assignee: Capital One Services, LLC, McLean, VA (US)

( * ) Notice: Subject to any disclaimer, the term of this patent is extended or adjusted under 35 U.S.C. 154(b) by 223 days.

(21) Appl. No.: 16/887,622

(22) Filed: May 29, 2020

(65) Prior Publication Data
US 2021/0374846 A1 Dec. 2, 2021

(51) Int. Cl.
G06Q 10/10 (2023.01)
G06F 17/18 (2006.01)
G06F 18/25 (2023.01)
G06F 18/2113 (2023.01)
G06Q 40/03 (2023.01)

(52) U.S. Cl.
CPC .............. *G06Q 10/10* (2013.01); *G06F 17/18* (2013.01); *G06F 18/2113* (2023.01); *G06F 18/251* (2023.01); *G06Q 40/03* (2023.01)

(58) Field of Classification Search
None
See application file for complete search history.

(56) References Cited

U.S. PATENT DOCUMENTS

| | | | |
|---|---|---|---|
| 6,009,415 A * | 12/1999 | Shurling | G06Q 40/00 705/35 |
| 7,783,565 B1 * | 8/2010 | Ajose | G06Q 40/06 434/323 |
| 9,098,875 B2 * | 8/2015 | Snell | G06F 16/287 |
| 10,163,156 B1 * | 12/2018 | Shapley | G06Q 40/025 |
| 10,701,096 B1 * | 6/2020 | Johnston | G06Q 10/20 |
| 2003/0149659 A1 * | 8/2003 | Danaher | G06Q 40/025 705/38 |

(Continued)

FOREIGN PATENT DOCUMENTS

AU 756154 B2 1/2003

*Primary Examiner* — William J Jacob
(74) *Attorney, Agent, or Firm* — Bookoff McAndrews, PLLC (57) ABSTRACT

Disclosed are systems and methods for consolidating credit profiles for co-applicants of a joint loan application. For example, a method may include: obtaining a first model score associated with the first applicant; receiving an address of the first applicant; obtaining a second model score associated with the second applicant; receiving an address of the second applicant; determining that the address of the first applicant and the address of the second applicant are the same; aggregating the first model score and the second model score to generate a joint model score for the first and second applicants based on the determination that the address of the first applicant and the address of the second applicant are the same; and generating the joint application for the first and second applicants at least based on the joint model score.

15 Claims, 6 Drawing Sheets

(56) References Cited

U.S. PATENT DOCUMENTS

| | | | | |
|---|---|---|---|---|
| 2004/0054619 A1* | 3/2004 | Watson | G06Q 10/10 | 705/38 |
| 2006/0106691 A1* | 5/2006 | Sheaffer | G06Q 30/0224 | 705/35 |
| 2006/0224501 A1* | 10/2006 | Louis | G06Q 40/02 | 705/38 |
| 2007/0011083 A1* | 1/2007 | Bird | G06Q 30/08 | 705/38 |
| 2010/0070407 A1* | 3/2010 | Rose | G06Q 20/40 | 705/325 |
| 2010/0274740 A1* | 10/2010 | Lambe | G06Q 40/10 | 705/36 T |
| 2012/0053981 A1* | 3/2012 | Lipps | G06Q 10/0635 | 705/7.28 |
| 2012/0054095 A1* | 3/2012 | Lesandro | G06F 9/452 | 705/39 |
| 2012/0180071 A1* | 7/2012 | Lesandro | G06Q 10/06 | 719/313 |
| 2012/0296806 A1* | 11/2012 | Abrahams | G06Q 40/025 | 705/38 |
| 2012/0317016 A1* | 12/2012 | Hughes | G06Q 40/025 | 705/38 |
| 2014/0279387 A1* | 9/2014 | Shifman | G06Q 40/025 | 705/38 |
| 2015/0039491 A1* | 2/2015 | Snell | G06Q 40/025 | 705/38 |
| 2015/0066772 A1* | 3/2015 | Griffin | G06Q 40/00 | 705/44 |
| 2018/0053164 A1* | 2/2018 | Rose | G06Q 20/405 | |
| 2018/0181962 A1* | 6/2018 | Barnhardt | G06Q 20/4016 | |
| 2019/0220705 A1* | 7/2019 | Min | G06N 20/00 | |
| 2020/0184556 A1* | 6/2020 | Celia | G06Q 50/18 | |
| 2020/0234305 A1* | 7/2020 | Knutsson | G06F 17/153 | |

* cited by examiner

METHODS AND SYSTEMS FOR CONSOLIDATING PROFILES FOR JOINT APPLICATION DETERMINATION

TECHNICAL FIELD

Various embodiments of the present disclosure relate generally to joint loan application decision systems and methods, and more particularly, to electronic systems and methods for consolidating profiles, e.g., credit profiles, for co-applicants of a joint loan application.

BACKGROUND

A significant percentage of loan applications are joint applications submitted by two or more co-applicants. Conventional joint application processing systems and methods determine and utilize a separate score, e.g., a Fair, Isaac and Company (FICO) score, for each of the co-applicants throughout a joint application decision process. Thus, a need exists for systems and methods for an effective joint application decision process. For example, there is a need to consolidate credit profiles associated with each co-applicant for a joint application for an effective and streamlined joint application decision process.

The present disclosure is directed to overcoming one or more of the above-referenced challenges. The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY OF THE DISCLOSURE

According to certain aspects of the disclosure, methods and systems are disclosed for consolidating credit profiles for co-applicants of a joint loan application.

In one aspect, a method is disclosed of generating a joint application for a first applicant and a second applicant. The method may include: testing, via one or more processors, a first permutation of aggregating a first model score and a second model score, wherein the first model score is associated with the first applicant, and the second model score is associated with the second applicant; generating, via the one or more processors, a risk model for the first and second applicants; determining, via the one or more processors, a second permutation of aggregating the first model score and the second model score based on the risk model; testing, via the one or more processors, the second permutation of aggregating the first model score and the second model score; aggregating, via the one or more processors, the first model score and the second model score to generate a joint model score for the first and second applicants based on the first permutation, the second permutation, or a combination of the first and second permutations; and generating, via the one or more processors, the joint application for the first and second applicants at least based on the joint model score.

In another aspect, there is provided a method of generating a joint application for a first applicant and a second applicant. The method may include: obtaining, via one or more processors, a first model score associated with the first applicant; receiving, via the one or more processors, an address of the first applicant; obtaining, via the one or more processors, a second model score associated with the second applicant; receiving, via the one or more processors, an address of the second applicant; determining, via the one or more processors, that the address of the first applicant and the address of the second applicant are the same; aggregating, via the one or more processors, the first model score and the second model score to generate a joint model score for the first and second applicants based on the determination that the address of the first applicant and the address of the second applicant are the same; and generating, via the one or more processors, the joint application for the first and second applicants at least based on the joint model score.

In another aspect, there is provided a method of generating a joint application for a first applicant and a second applicant. The method may include: obtaining, via one or more processors, a first model score associated with the first applicant, wherein the first model score comprises a first credit score, a first income score, and/or a first predetermined score associated with the first applicant; receiving, via the one or more processors, an address of the first applicant; obtaining, via the one or more processors, a second model score associated with the second applicant, wherein the second model score comprises a second credit score, a second income score, and/or a second predetermined score associated with the second applicant; receiving, via the one or more processors, an address of the second applicant; determining, via the one or more processors, that the address of the first applicant and the address of the second applicant are the same; aggregating, via the one or more processors, the first model score and the second model score to generate a joint model score for the first and second applicants based on a determination that the address of the first applicant and the address of the second applicant are the same; and generating, via the one or more processors, the joint application for the first and second applicants at least based on the joint model score.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION OF EMBODIMENTS

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section. Both the foregoing general description and the following detailed description are exemplary and explanatory only and are not restrictive of the features, as claimed.

In this disclosure, the term "based on" means "based at least in part on." The singular forms "a," "an," and "the" include plural referents unless the context dictates otherwise. The term "exemplary" is used in the sense of "example" rather than "ideal." The terms "comprises," "comprising," "includes," "including," or other variations thereof, are intended to cover a non-exclusive inclusion such that a process, method, or product that comprises a list of elements does not necessarily include only those elements, but may include other elements not expressly listed or inherent to such a process, method, article, or apparatus. Relative terms, such as, "substantially" and "generally," are used to indicate a possible variation of ±10% of a stated or understood value.

Figure 1:
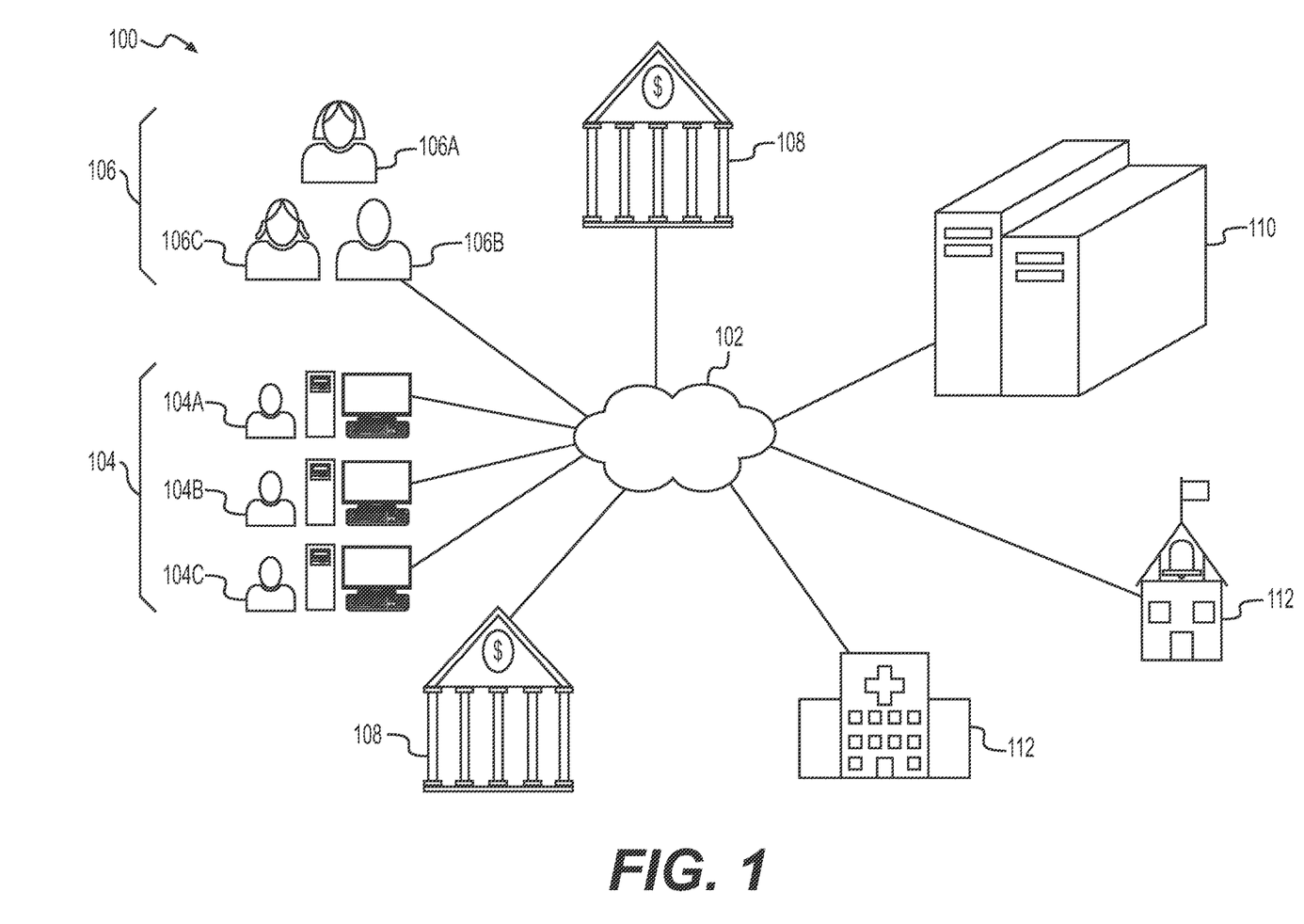
FIG. 1 depicts an exemplary system infrastructure, according to one or more embodiments.

FIG. 1 illustrates an exemplary system 100, which may encompass aspects of the embodiments disclosed herein, and/or in which steps of methods disclosed herein may be performed. System 100 may include a network 102, which may connect a plurality of customers 104 (e.g., customer 104a, customer 104b, and customer 106c), a plurality of users 106 (e.g., user 106a, user 106b, and user 106c), account institutions 108, a server system 110, and service providers 112. While three customers 104 and users 106 are depicted in FIG. 1, it is understood that there may be one, two, or more than three customers 104 and users 106 in embodiments of system 100.

System 100 may include computer hardware, computer software, and/or combinations of both associated with each aspect of system 100. Aspects of system 100 may be located in similar or disparate locations. In some instances, for example, customers 104, users 106, account institutions 108, server system 110, and service providers 112 may each be in separate physical locations (e.g., on separate computer systems, in separate databases, and/or in separate geographic locations). In some instances, for example, multiple users 106, multiple account institutions 108, multiple server systems 110, and multiple service providers 112 may be located in separate geographical locations. In further instances, two or more of the aspects of system 100 may be located in the same physical location, e.g., on the same computer, in the same database, or in the same geographic location. For example, an account institution 108 may house a server system 110 at a geographic location.

Aspects and components of system 100 may be connected by wired or wireless connections. Some such connections are represented by the straight lines connecting some of the aspects of system 100 in FIG. 1; however, it is contemplated that additional or different wired or wireless connections may exist between aspects of system 100. Wired or wireless connections between aspects of system 100 may include, for example, connections within a single machine, or wired or wireless connections over a local area network or a wide area network (e.g., the Internet). Furthermore, while aspects of system 100 are shown in FIG. 1, it is contemplated that system 100 may include more components, fewer components, and/or alternate or additional configurations of the depicted components.

Network 102 may be any suitable wired or wireless network, or combination of wired or wireless networks. For example, in some embodiments, network 102 may include a local area network (LAN), wide area network (WAN), a public switch telephone network (PSTN), and/or the Internet. Generally, network 102 may serve to electronically connect two or more components of system 100, or two or more computers, electronic terminals, databases, servers, devices, user interfaces, or other electronic aspects of one or more components of system 100. Any part of system 100 may be connected directly to another (e.g., via a wired or wireless connection) over network 102, or may be connected indirectly via one or more intermediary servers, computers, LANs, WANs, routers, etc. to another part or parts of system 100. In some embodiments, network 102 may be simply a plurality of electronic connections between devices, servers, and the like.

In some embodiments, two or more components of system 100 may share a physical location. For example, server system 110 may be located within, e.g., an account institution 108. In some embodiments, each account institution 108 and/or service provider 112 may include a server system 110. One or more users 106 may be located in the same geographic location (e.g., in the same room, at the same address, or in the same city, state, province, or country).

Each customer 104 may be an individual or an entity having a device suitable for connecting to other components of system 100 via network 102. In some embodiments, a customer 104 may be a person. In further embodiments, a customer 104 may be, e.g., an institution (such as an educational institution, a nonprofit organization, etc.) or a company. Customers 104 may be customers of, e.g., one or more of account institutions 108 and/or service providers 112. In some embodiments, customers 104 may be enrolled in one or more programs, rosters, account types, services, etc. in an account institution 108 or a service provider 112. In some embodiments, for example, a customer 104 may be an applicant for a loan from an account institution 108. As another example, two or more customers 104 (e.g., customer 104a, customer 104b, and/or customer 104c) may be co-applicants for a joint loan application to one or more account institutions 108. In further embodiments, customers 104 may hold financial accounts at an account institution 108. In some embodiments, customers 104 may have multiple accounts at one or more of account institutions 108 or service providers 112. In some embodiments, customers 104 may each include a computing system or device, such as device 600 described with respect to FIG. 6.

Users 106 may be additional individuals or entities having devices suitable for connecting to other components of system 100 via network 102. In some embodiments, users 106 may be individual people. In further embodiments, users 106 may be, e.g., institutions (such as educational institutions, nonprofit organizations, etc.) or companies. In some embodiments, users 106 may include a mix of individuals and institutions or other entities. Some of users 106 may be customers, similar to customers 104. As with customers 104, users 106 may be customers of, e.g., one or more of account institutions 108 and/or service providers 112. Users 106 may be enrolled in programs, rosters, account types, services, etc. in account institutions 108 and/or service providers 112. For example, in some embodiments, one or more of users 106 may have multiple accounts at one or more of account institutions 108 or service providers 112. As another example, two or more of users 106 (e.g., user 106a, user 106b, and/or user 106c) may be co-applicants for a joint loan application to one or more account institutions 108. One or more of users 106 may share some characteristics with customer 104, such as account types, demographic information, financial needs or patterns, and the like. In some embodiments, users 106 may share information about their characteristics with, e.g., account institutions 108 over network 102. In some embodiments, users 106 may each include a computing system or device, such as the device 600 described with respect to FIG. 6.

Account institutions 108 may be any entities or organizations offering accounts to customers or users (e.g., customers 104 and/or users 106). An account may be any type of account directly or indirectly related to a user's finances. Examples include bank accounts, investment accounts, loan accounts (e.g., for auto loans, student loans, mortgages, or other loans), credit accounts, or accounts for managing regular payments (e.g., student or tuition accounts, leases, etc.). In some embodiments, account institutions 108 may include one or more servers or server systems storing the details of accounts associated with customers 104 and/or users 106. Such servers or server systems may be connected to other aspects of system 100 via one or more connections, such as via network 102. In some embodiments, account institutions 108 may each include a computing system or device, such as the device 600 described with respect to FIG. 6.

Server system 110 may comprise one or more computers, and may be configured to house databases or other electronic storage systems. Further, server system 110 may be configured to store and/or execute one or more functions, algorithms, or manipulations of data housed within it or transferred to it. In some embodiments, server system 110 may receive and send data via, e.g., network 102, and may store, manipulate, or perform calculations using such data. Server system 110 may also be configured or authorized to access, send, retrieve, or manipulate data from other aspects of system 100, such as from account institutions 108 or service providers 112. For example, in some embodiments, server system 110 may be authorized to access secure data pertaining to one or more digital accounts associated with one or more account institutions 108. In some embodiments, server system 110 may house one or more machine learning algorithms and may execute such algorithms according to methods of the present disclosure. In some embodiments, server system 110 may include one or more modules, models, or engines, which may each be software components stored in the server system 110. For example, server system 110 may include a same/different address treatment test module 302, a joint application decision algorithm 206, and a decision model design module 304 as described in further detail below with reference to FIGS. 2 and 3. Server system 110 may be configured to utilize one or more modules, models, or engines when performing various methods described in this disclosure.

In some examples, server system 110 may have a cloud computing platform with scalable resources for computation and/or data storage, and may run one or more applications on the cloud computing platform to perform various computer-implemented methods described in this disclosure. In some embodiments, some of the one or more modules, models, or engines may be combined to form fewer modules, models, or engines. In some embodiments, some of the one or more modules, models, or engines may be separated into separate, more numerous modules, models, or engines. In some embodiments, some of the one or more modules, models, or engines may be removed while others may be added. While one server system 110 is depicted in FIG. 1, it is contemplated that, in some aspects, multiple server systems 110 may be a part of systems of the present disclosure and/or may execute methods of the present disclosure in concert. In some embodiments, the server system 110 may include computing systems, such as device 600 described with respect to FIG. 6.

Service providers 112 may include any institutions, businesses, individuals, or organizations providing services to, e.g., users within system 100 (e.g., users 106 and/or customers 104). Examples of service providers 112 may include medical service providers (e.g., hospitals, doctors, surgical centers, diagnostics laboratories, emergency responders, etc.) In some embodiments, service providers 112 may require payments from customers 104 in exchange for services performed. In some embodiments, a service provider 112 may be associated with an account institution 108, such that users (e.g., users 106) may hold accounts (e.g., loan accounts, bank accounts, debit accounts, etc.) for sending or receiving payments to or from service provider 112. In some embodiments, service providers 112 may each include computing systems, such as device 600 described with respect to FIG. 6. In some embodiments, account institutions 108 may include one or more servers or server systems storing the details of services rendered to customers 104 and/or users 106. Such servers or server systems may be connected to other aspects of system 100 via one or more connections, such as via network 102.

Figure 2:
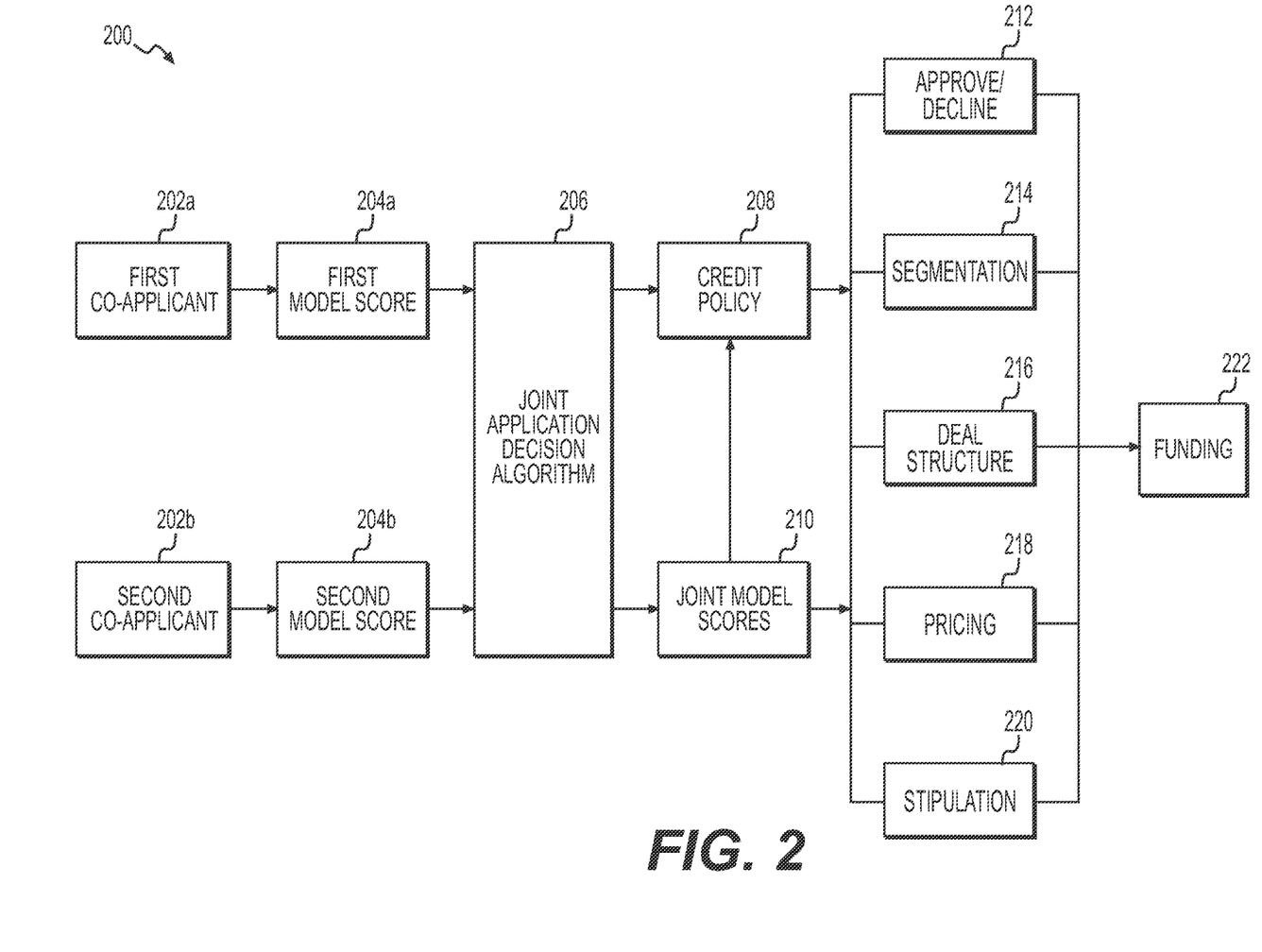
FIG. 2 depicts a system flow diagram of an exemplary system and method of processing a joint application using a joint application decision algorithm, according to one or more embodiments.

FIG. 2 is a system flow diagram illustrating a method 200 of processing a joint application for a loan, according to one or more embodiments. It is understood that the method depicted in FIG. 2 may be performed by a combination of at least the account institutions 108 and the server system 110. As shown in FIG. 2, a first co-applicant 202a and a second co-applicant 202b (also referred to as a first co-borrower and a second co-borrower) may submit a joint application for a loan to an account institution 108. In some embodiments, the first co-applicant 202a and the second co-applicant 202b may be users 106a, 106b and/or customers 104a, 104b as described above with reference to FIG. 1. In some embodiments, the joint application may contain information regarding the first and second co-applicants 202a-b. It is understood that a joint application may contain personal information such as address information, credit history, financial assets, outstanding debts, and/or any other appropriate information associated with the first and second co-applicants 202a-b necessary for evaluating a loan application. While the embodiments disclosed herein describe a joint application with two co-applicants, it is understood that the embodiments disclosed herein may apply to instances in which the joint application may be submitted by more than two co-applicants.

Once the joint application has been submitted by the first and second co-applicants 202a-b, a first model score 204a associated with the first co-applicant 202a and a second model score 204b associated with the second co-applicant 202b may be obtained. In some embodiments, the first co-applicant 202a may submit a first score indicating a creditworthiness of the first co-applicant 202a and the second co-applicant 202b may submit a second score indicating a creditworthiness of the second co-applicant 202b. For example, the submitted first and second score indicating creditworthiness may be external credit scores (e.g., FICO scores) issued by one or more credit bureaus. In some embodiments, the first and second model scores 204a-b may reflect the first co-applicant income and the second co-applicant income, respectively. For example, the first and second model scores 204a-b may be first and second income scores. In some embodiments, the first and second model scores 204*a-b* may be internal scores determined by the account institution 108 based on the information contained in the joint application. For example, an internal score used as a model score 204*a* for the first co-applicant 202*a* may be a combination of the first co-applicant's external credit scores, income, etc. In some embodiments, the first model score 204*a* may include a first set of scores including a first external credit score, a first income score, and a first internal score and the second model score 204*b* may include a second set of scores including a second external credit score, a second income score, and a second internal score. In some embodiments, the first and second internal scores may be determined based on indications of creditworthiness of the first and second co-applicants 202*a-b*. For example, the first and second internal scores may be determined based on a number of credit inquires of the first and/or second co-applicants 202*a-b*, % of credit used of the first and/or second applicants 202*a-b*, and/or credit limits for the first and/or second co-applicants 202*a-b*. In some embodiments, the first and second internal scores may be determined further based on information provided in the joint application, such as location of residence for the first and/or second co-applicants 202*a-b*, etc.

The joint application decision algorithm 206 may aggregate the first and second model scores 204*a-b* to generate a joint score for the co-applicants 202*a-b*. The joint application decision algorithm 206 may output one or more joint model scores 210. For example, the one or more joint model scores 210 may include a joint external score, a joint income score, a joint internal score, etc. As an example, the joint income score may be an aggregation of the first and second income scores.

In some embodiments, the joint application decision algorithm 206 may aggregate the first and second model scores 204*a-b* based on a determination that the address of the two co-applicants are the same. For example, the co-applicants 202*a-b* may provide each individual address information in the process of submitting the joint application. In addition to the same address determination, or in the alternative, the joint application decision algorithm 206 may aggregate the first and second model scores 204*a-b* based on a determination that the two co-applicants are married, family members, share a joint bank account, etc., in some embodiments. The joint application decision algorithm 206 may determine whether the two co-applicants reside at the same address. Based on a determination that the two co-applicants reside at the same address, the joint application decision algorithm 206 may aggregate the first and second model scores 204*a-b* to form a joint model score. In the context of the current disclosure, the joint model score may be a metric to indicate a probability that the applicants, e.g., first and second co-applicants 202*a-b*, will pay off a loan. In some embodiments, the first and second model scores 204*a-b* may be aggregated by determining an average of the first model score 204*a* and the second model score 204*b*. Accordingly, the joint model score may be the average of the first model score 204*a* and the second model score 204*b*. In some embodiments, the first and second model scores 204*a-b* may be aggregated by determining and utilizing the higher or lower of the first and second model scores 204*a-b*. In some embodiments, the method of score aggregation performed by the joint application decision algorithm 206 may be shaped by the same/different address treatment test module 302 and/or the decisioning model design module 304, as will be described in further detail with reference to FIG. 3 below.

As shown in FIG. 2, the one or more joint model scores 210 determined by the joint application decision algorithm 206 may be used to determine a credit policy 208 for the co-applicants with respect to the joint application. In some embodiments, a limit to the credit policy may be determined in order to: determine a maximum loan-to-value (LTV) for the co-applicants, determine a period of time from a previous credit transaction that may be required to pass in order to submit another application, and/or determine credit requirements for the co-applicants in order to submit the joint application. In some embodiments, the one or more joint model scores 210 may include a joint external score. For example, the joint external score may be an aggregated FICO score for the first and second co-applicants 202*a-b*. In such embodiments, the joint external score may be used to determine an appropriate credit policy 208 for the co-applicants.

The determined credit policy 208 and the one or more joint model scores 210 may be used to approve the joint application (212), segment the joint application (214), determine a deal structure for the joint application (216), determine pricing for the joint application (218), and/or determine one or more stipulations for accepting the joint application (220). In step 212, the joint application may be approved if the joint application indicates one or more required qualifications. For example, the joint application may be approved if the co-applicants are a predetermined age or older, have sufficient credit history, and/or have first and second model scores, e.g., 204*a-b*, that exceed a predetermined threshold. In some embodiments, the determination of pricing for the joint application of step 218 may be included in step 216 in which the deal structure for the joint application may be determined. In some embodiments, the determinations made in steps 212-220 may be further based on additional information provided by the co-applicants 202*a-b* and/or information obtained from other account institutions 108 and/or service providers 112.

In some embodiments, the joint application may be segmented (214) based on at least the determined credit policy 208 and the one or more joint model scores 210 into, for example, a prime credit segment, a sub-prime credit segment, and a near-prime credit segment. That is, the joint application may be categorized into a credit category (e.g., the prime credit segment, the sub-prime credit segment, or the near-prime credit segment) based on the determined credit policy 208 and the one or more joint model scores 210. In the context of the current disclosure, a prime credit segment may refer to a category under which an application submitted by applicants with a relatively high creditworthiness may be allocated, and a sub-prime credit segment may refer to a category under which an application submitted by applicants with a relatively low creditworthiness may be allocated. For example, an applicant may be allocated to the prime credit segment if the applicant has a FICO score that exceeds 700. As another example, an applicant may be allocated to the near-prime credit segment if the applicant has a FICO score that is between 600 and 700. As yet another example, an applicant may be allocated to the sub-prime credit segment if the applicant has a FICO score that falls below 600. In some embodiments, the determined segment may determine the terms of the loan offered to the co-applicants as will be described in further detail below with reference to the deal structure 216.

In some embodiments, a deal structure may be determined (216) for the joint model based on at least the determined credit policy 208, the one or more joint model scores 210, and/or the segmentation 214. For example, the deal structuring process for the joint application may include structuring one or more terms of a loan by adjusting a price of the loan, adjusting a length of the loan, modifying the amount to be financed (ATF), and/or adjusting other variables such as loan to value (LPV) limits, purchase of warrantees, etc.

In some embodiments, stipulation (220) may be needed for the joint application. That is, a loan approval for the joint application may be conditional based on the execution of one or more conditions. For example, income stipulation (e.g., additional income verification) may be required for the joint application at least based on the determined credit policy 208 and the one or more joint model scores 210.

In some embodiments, the allocated funds for the joint application, e.g., the amount to be financed according to the deal structure 216, may be distributed (222) to the co-applicants 202a-b once each of the steps 212-220 are performed and the conditions, if there are any (e.g., the conditions for the stipulation 220), are satisfied.

Figure 3:
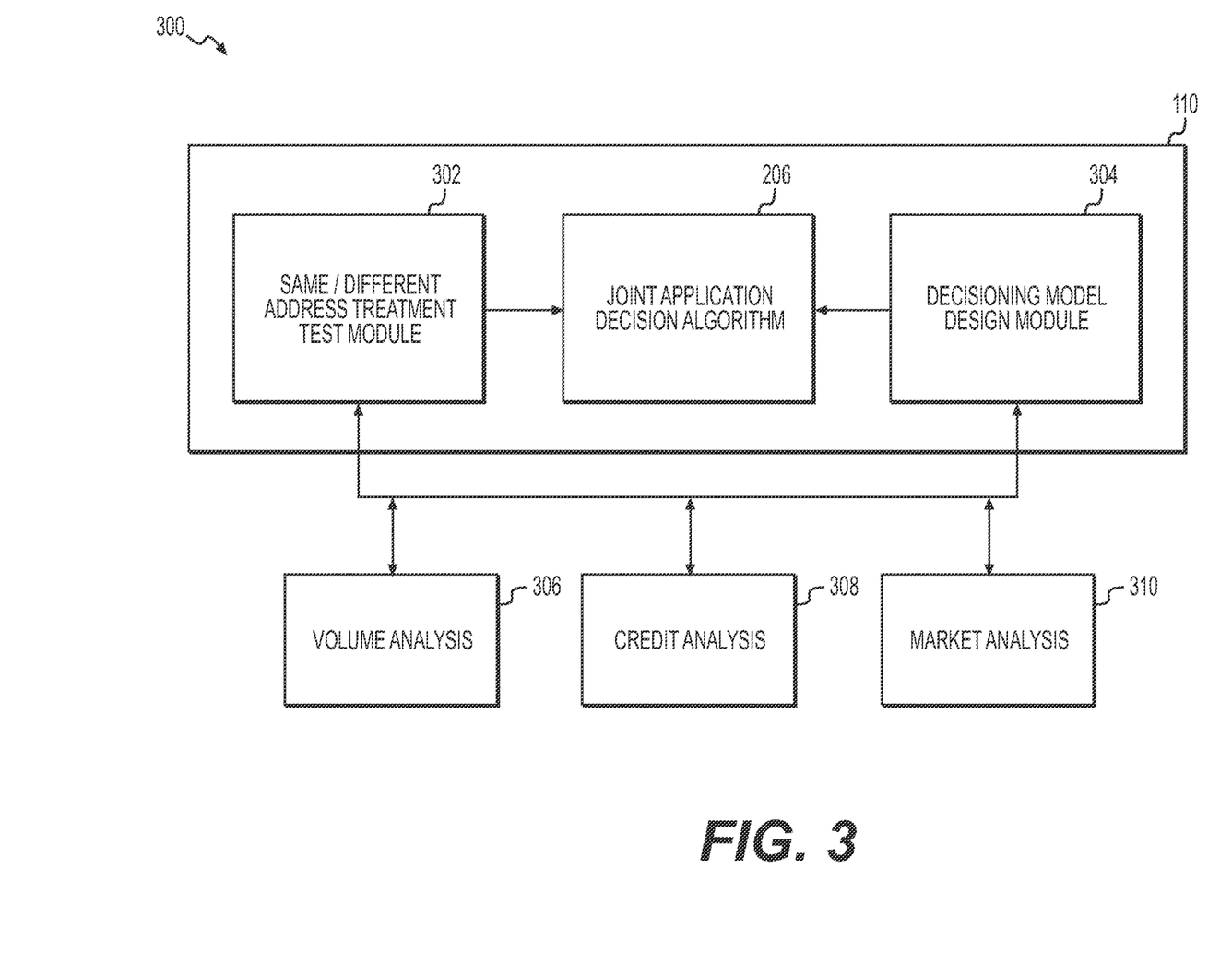
FIG. 3 depicts an exemplary server system, according to one or more embodiments.

FIG. 3 depicts an exemplary server system 110 according to some embodiments. As shown in FIG. 3, server system 110 may include a same/different address treatment test module 302 (hereinafter referred to as "address test module 302" for brevity), the joint application decision algorithm 206, and a decisioning model design module 304 (hereinafter referred to as "design module 304" for brevity), according to some embodiments.

As described above with reference to FIG. 2, the joint application decision algorithm 206 may be configured to receive the first and second model scores 204a-b associated with the first and second co-applicants 202a-b and determine one or more joint model scores 210. In some embodiments, the joint application decision algorithm 206 may be configured to perform one or more of the following: (i) determine how to aggregate first and second model scores 204a-b (e.g., first and second external scores, first and second income scores, and first and second internal scores) associated with the first and second co-applicants 202a-b; (ii) determine whether a price bump may be provided to a joint application which has been segmented under a prime credit segment; and (iii) determine whether the joint model scores need to be adjusted based on a determination that a joint application is being submitted by first time co-applicants. In some embodiments, a price bump may be additively applied to a determined price for the joint application, e.g., in steps 216 and/or 218 with reference to FIG. 2, that has been segmented under the prime credit segment. As an exemplary embodiment, the joint application decision algorithm 206 may aggregate the first and second model scores 204a-b based on a determination that the co-applicants reside at the same address. In addition to the same address determination, or in the alternative, the joint application decision algorithm 206 may aggregate the first and second model scores 204a-b based on a determination that the two co-applicants are married, are family members, share a joint bank account, etc., in some embodiments. The joint application decision algorithm 206 may aggregate the first and second model scores 204a-b by taking the average of the first and second model scores 205a-b and designating the average as the joint model score 210. This is not required, however, and the method of how and when the joint application decision algorithm 206 aggregates the first and second model scores 204a-b may be shaped by input from the address test module 302 and the design module 304. For example, the joint application decision algorithm 206 may determine that the first and second model scores 204a-b should not be aggregated based on a determination that the first and second co-applicants 202a-b do not reside at the same address. Such determinations may be shaped by input from the address test module 302 and the design module 304, as will be described in further detail below.

In some embodiments, the address test module 302 may perform one or more tests based on different permutations of the aggregation method based on a determination of whether the first and second co-applicants reside at a same address. For example, the address test module 302 may test a first permutation of the aggregation method which may include aggregating the first and second model scores 204a-b by taking the average of the first and second model scores 204a-b based on a determination that the first and second co-applicants reside at the same address. As another example, the address test module 302 may test a second permutation of the aggregation method which may include aggregating the first and second model scores 204a-b by utilizing the higher score of the first and second model scores 204a-b based on a determination that the first and second co-applicants reside at the same address. As yet another example, the address test module 302 may test a third permutation of the aggregation method which may include not aggregating the first and second model scores 204a-b, e.g., using the two separate first and second model scores 204a-b throughout the joint loan application process, based on a determination that the first and second co-applicants do not reside at the same address. The address test module 302 may test such permutations of the aggregation method and obtain test results. In some embodiments, the address test module 302 may test the permutations of the aggregation method based on a volume analysis 306 and/or a credit analysis 308. In some embodiments, the credit analysis 308 may provide information regarding how each of the aforementioned permutations of the aggregation method may have affected the creditworthiness of the applicants. In some embodiments, the volume analysis 306 may be configured to determine whether more joint applications for some applicants may need to be processed under a certain permutation of the aggregation method. For example, a certain permutation may need more data points, e.g., information based on processing more joint applications under the certain permutation, in order to compare with other permutations.

The address test module 302 may determine the similarities and differences between the test results of the various permutations. Such determined similarities and differences may be transmitted to the joint application decision algorithm 206 according to some embodiments. In such embodiments, the joint application decision algorithm 206 may optimize the current aggregation method based on the received test results of the various permutations. For example, one or more adjustments may be made to one or more permutations or a combination of two or more permutations may be determined based on the received test results to obtain an optimized permutation.

In some embodiments, the design module 304 may determine information that may be significant to identifying a credit risk in accepting a loan application based on volume analysis 306, credit analysis 308, and/or market analysis 310. In some embodiments, market analysis 310 may be directed to obtaining information regarding other loan providers in the market and determining how the methods of processing joint applications, e.g., one or more permutations of the aggregation method, may differ from the other loan providers. For example, the design module 304 may determine that when first and second model scores 204a-b for first and second co-applicants 202a-b who do not reside at the same address are relatively low, the design module 304 may determine that a joint model score 210 for the first and second co-applicants 202*a-b* in such instances should be lower than the lower of the first and second model scores 204*a-b*. This may be based on a determination by the design module 304 that in instances in which two co-applicants both have relatively low model scores, a joint loan for the two co-applicants may show lower return on investment, e.g., non-timely payments, etc., compared to if one of the co-applicants had submitted a separate loan application on his or her own.

As another example, the design module 304 may determine that when first and second model scores 204*a-b* for first and second co-applicants 202*a-b* who reside at the same address are relatively low, a joint model score 210 for the first and second co-applicants 202*a-b* should be lower than the lower of the first and second model scores 204*a-b*, but higher than a joint score for first and second co-applicants 202*a-b* who do not reside at the same address. As yet another example, the design module 304 may determine that when first and second model scores 204*a-b* for first and second co-applicants 202*a-b* who reside at the same address are relatively high, the design module 304 may determine that a joint model score 210 for the first and second co-applicants 202*a-b* in such instances should be higher than the higher of the first and second model scores 204*a-b*. In the context of the current disclosure, relatively higher and/or lower model scores may be referring to model scores that are higher and/or lower than a predetermined average score, e.g., FICO score, income score, etc.

Such determined information that may be significant to identifying a credit risk may be transmitted by the design module 304 to the joint application decision algorithm 206 according to some embodiments. In such embodiments, the joint application decision algorithm 206 may optimize the current aggregation method based on the received information. Accordingly, the joint application decision algorithm 206 may be continuously optimized based on input from the address test module 302 and/or the design module 304.

Figure 4:
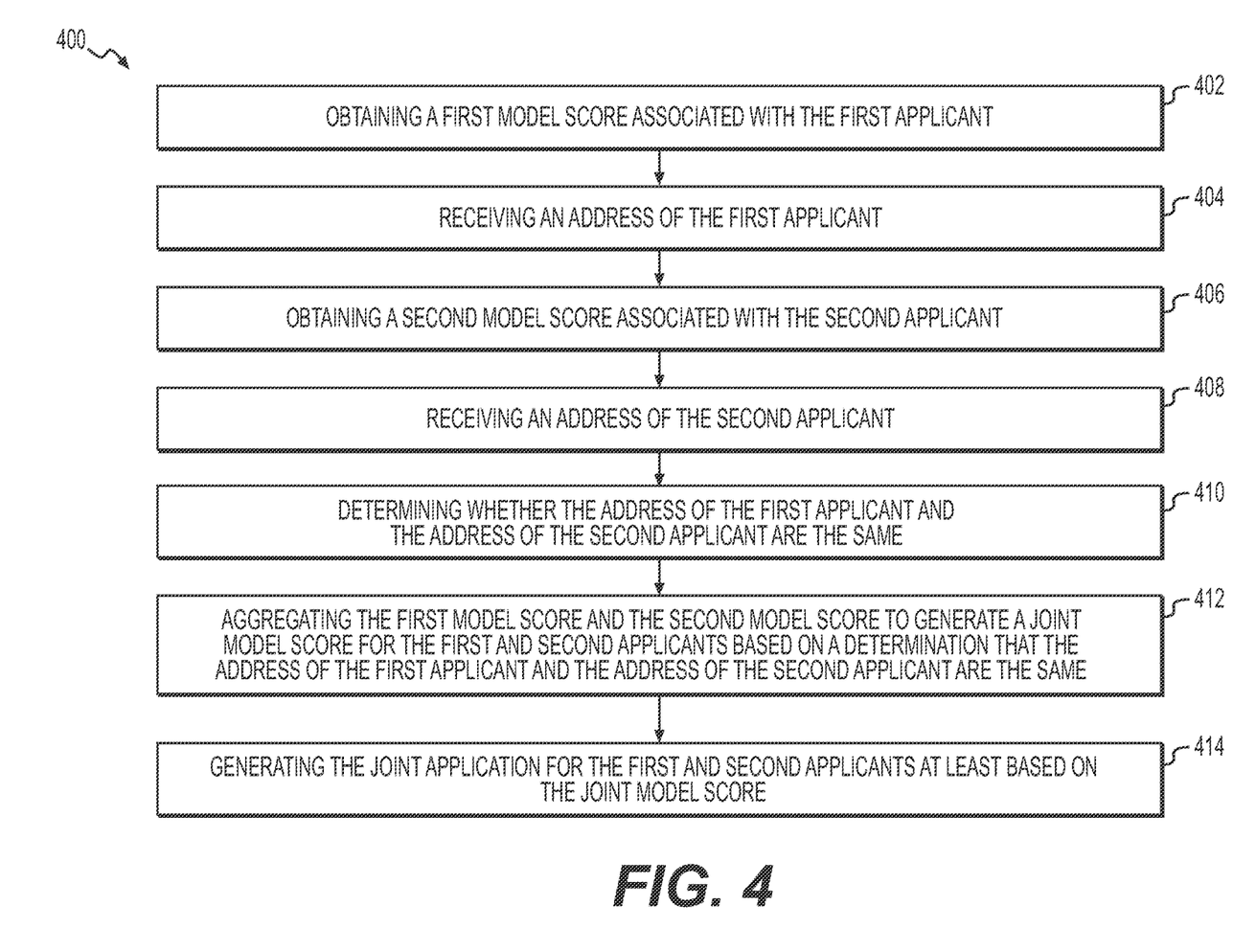
FIG. 4 depicts a flowchart of an exemplary method for generating a joint application, according to one or more embodiments.

FIG. 4 depicts a flowchart of an exemplary process 400 for generating a joint application for a first applicant and a second applicant, according to one or more embodiments. In step 402, a first model score associated with the first applicant may be obtained. In step 404, an address of the first applicant may be received. In step 406, a second model score associated with the second applicant may be obtained. In step 408, an address of the second applicant may be received. In step 410, it is determined whether the address of the first applicant and the second applicant are the same. In step 412, based on a determination that the address of the first applicant and the address of the second applicant are the same, the first model score and the second model score are aggregated to generate a joint model score for the first and second applicants. In step 414, a joint application is generated for the first and second applicants at least based on the joint model score.

In some embodiments, the first model score may comprise a first credit score, a first income score, and/or a first predetermined score associated with the first applicant. In some embodiments, the second model score may comprise a second credit score, a second income score, and/or a second predetermined score associated with the second applicant.

In some embodiments, obtaining the first model score associated with the first applicant may include: receiving, from the first applicant, the first credit score, the first income score, and/or the first predetermined score associated with the first applicant; and generating the first model score based on the received first credit score, first income score, and/or first predetermined score.

In some embodiments, obtaining the second model score associated with the second applicant may include: receiving, from the second applicant, the second credit score, the second income score, and/or the second predetermined score associated with the second applicant; and generating the second model score based on the received second credit score, second income score, and/or second predetermined score.

In some embodiments, aggregating the first model score and the second model score to generate the joint model score for the first and second applicants may include determining that the first model score is higher than or equal to the second model score, and selecting the first model score or the second model score as the joint model score for the first and second applicants.

In some embodiments, aggregating the first model score and the second model score to generate the joint model score for the first and second applicants may include determining an average of the first and second model scores, and selecting the determined average of the first and second model scores as the joint model score for the first and second applicants.

In some embodiments, aggregating the first model score and the second model score to generate the joint model score for the first and second applicants may include adding the second model score to the first model score or subtracting the second model score from the first model score to generate the joint model score for the first and second applicants.

In some embodiments, method 400 may include a further step in which a joint credit policy may be determined for the first and second applicants at least based on the joint model score. In such embodiments, method 400 may include a further step in which an outcome for the joint application may be determined at least based on the joint credit policy and/or the joint model score. In some embodiments, determining the outcome for the joint application may comprise at least one or more of: approving the joint application, declining the joint application, segmenting the joint application, structuring a deal for the joint application, determining a price for the joint application, or stipulating a requirement for acceptance of the joint application.

Figure 5:
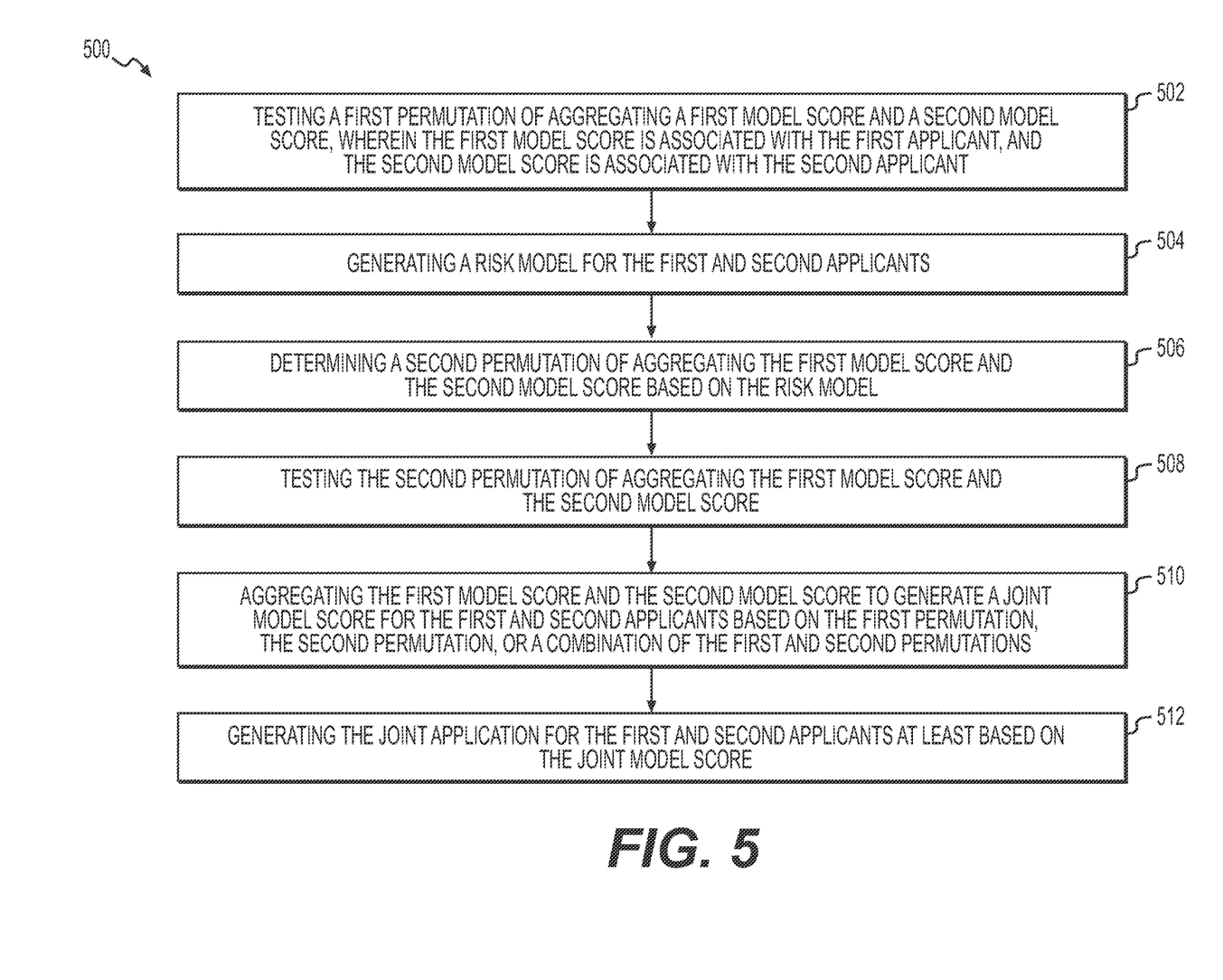
FIG. 5 depicts a flowchart of an exemplary method for generating a joint application, according to one or more embodiments.

FIG. 5 depicts a flowchart of an exemplary process 500 for generating a joint application for a first applicant and a second applicant, according to one or more embodiments. In step 502, a first permutation of aggregating a first model score and a second model score, wherein the first model score is associated with the first applicant, and the second model score is associated with the second applicant, is tested. In step 504, a risk model may be generated for the first and second applicants. In step 506, a second permutation of aggregating the first model score and the second model score may be determined based on the risk model. In step 508, the second permutation of aggregating the first model score and the second model score may be tested. In step 510, the first model score and the second model score may be aggregated to generate a joint model score for the first and second applicants based on the first permutation, the second permutation, or a combination of the first and second permutations. In step 512, the joint application for the first and second applicants may be generated at least based on the joint model score. In some embodiments, the first risk model may be generated at least based on a credit score of the first applicant and a credit score of the second applicant.

In some embodiments, the first permutation of aggregating the first model score and the second model score includes receiving an address of the first applicant, receiving an address of the second applicant, and determining that the address of the first applicant and the address of the second applicant are the same.

In some embodiments, the first permutation of aggregating the first model score and the second model score further includes aggregating the first model score and the second model score to generate the joint model score based on a determination that the first applicant address and the second applicant address are the same. In some embodiments, aggregating the first model score and the second model score to generate the joint model score based on the determination that the first applicant address and the second applicant address are the same includes determining an average of the first and second model scores, and selecting the determined average of the first and second model scores as the joint model score for the first and second applicants.

In some embodiments, testing the first permutation of aggregating the first model score and the second model score is based on at least one of a credit analysis of the first permutation or a market demand for the first permutation.

In some embodiments, process 500 may further include testing a third permutation of aggregating the first model score and the second model score, and comparing the first permutation and the third permutation. Comparing the first and third permutations may include (i) comparing a credit analysis of the first permutation and a credit analysis of the third permutation and/or (ii) comparing a market demand for the first permutation and a market demand for the third permutation. In some embodiments, process 500 may further include aggregating the first model score and the second model score to generate the joint model score for the first and second applicants based on the first permutation, the second permutation, the third permutation, or any combination of the first, second, and third permutations. The step of aggregating the first and second model scores may be performed according to any method for aggregating model scores described herein.

Figure 6:
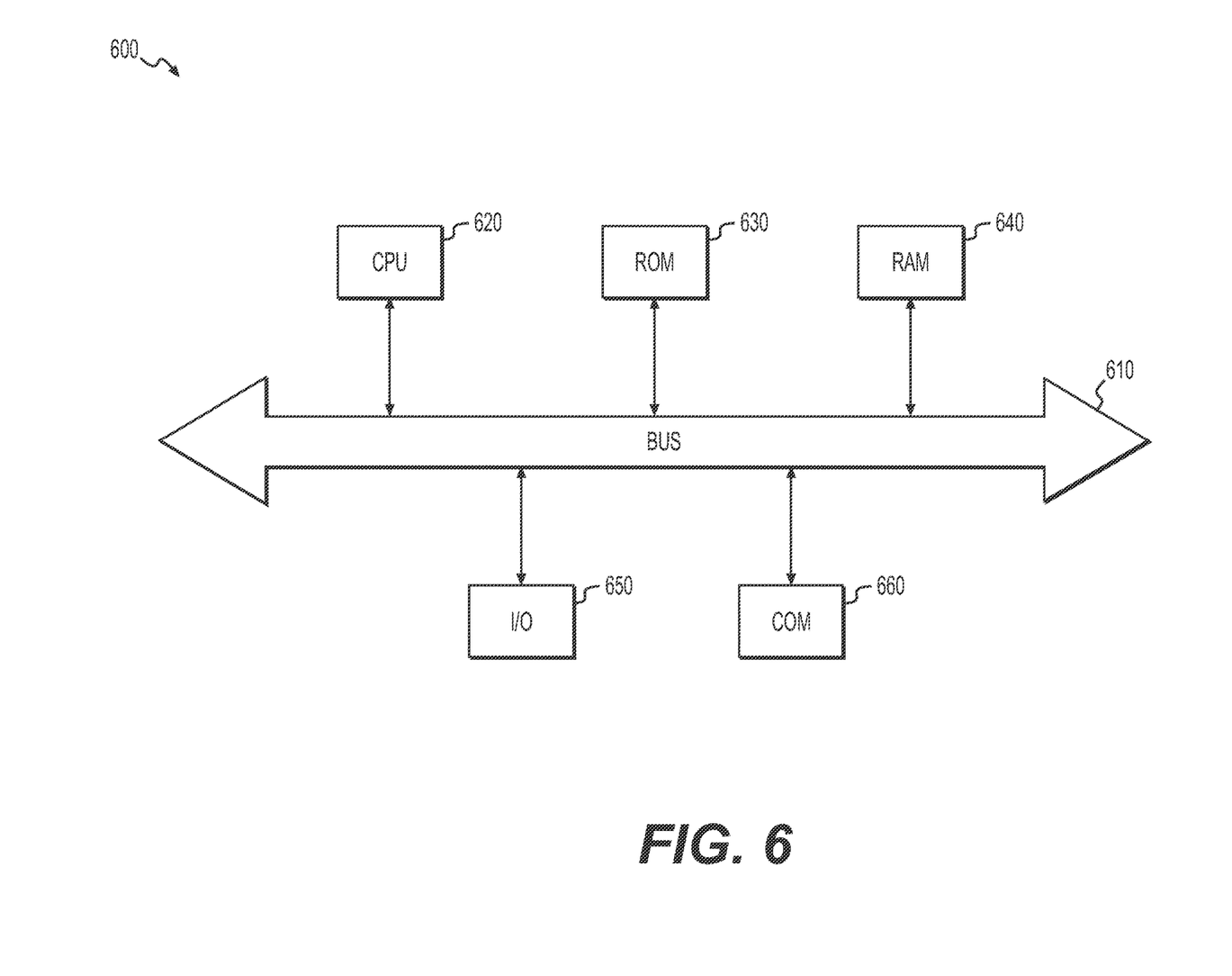
FIG. 6 depicts an example of a computing device, according to one or more embodiments.

As shown in FIG. 6, device 600 (e.g., customers 104, users 106, account institutions 108, server system 110, and service providers 112) may include a central processing unit (CPU) 620. CPU 620 may be any type of processor device including, for example, any type of special purpose or a general-purpose microprocessor device. As will be appreciated by persons skilled in the relevant art, CPU 620 also may be a single processor in a multi-core/multiprocessor system, such system operating alone, or in a cluster of computing devices operating in a cluster or server farm. CPU 620 may be connected to a data communication infrastructure 610, for example, a bus, message queue, network, or multi-core message-passing scheme.

Device 600 also may include a main memory 640, for example, random access memory (RAM), and also may include a secondary memory 630. Secondary memory 630, e.g., a read-only memory (ROM), may be, for example, a hard disk drive or a removable storage drive. Such a removable storage drive may comprise, for example, a floppy disk drive, a magnetic tape drive, an optical disk drive, a flash memory, or the like. The removable storage drive in this example reads from and/or writes to a removable storage unit in a well-known manner. The removable storage unit may comprise a floppy disk, magnetic tape, optical disk, etc., which is read by and written to by the removable storage drive. As will be appreciated by persons skilled in the relevant art, such a removable storage unit generally includes a computer usable storage medium having stored therein computer software and/or data.

In alternative implementations, secondary memory 630 may include other similar means for allowing computer programs or other instructions to be loaded into device 600. Examples of such means may include a program cartridge and cartridge interface (such as that found in video game devices), a removable memory chip (such as an EPROM, or PROM) and associated socket, and other removable storage units and interfaces, which allow software and data to be transferred from a removable storage unit to device 600.

Device 600 also may include a communications interface ("COM") 660. Communications interface 660 allows software and data to be transferred between device 800 and external devices. Communications interface 660 may include a modem, a network interface (such as an Ethernet card), a communications port, a PCMCIA slot and card, or the like. Software and data transferred via communications interface 660 may be in the form of signals, which may be electronic, electromagnetic, optical, or other signals capable of being received by communications interface 660. These signals may be provided to communications interface 660 via a communications path of device 600, which may be implemented using, for example, wire or cable, fiber optics, a phone line, a cellular phone link, an RF link or other communications channels.

Device 600 also may include input and output ports 650 to connect with input and output devices such as keyboards, mice, touchscreens, monitors, displays, etc. Of course, the various server functions may be implemented in a distributed fashion on a number of similar platforms, to distribute the processing load. Alternatively, the servers may be implemented by appropriate programming of one computer hardware platform.

The systems, apparatuses, devices, and methods disclosed herein are described in detail by way of examples and with reference to the figures. The examples discussed herein are examples only and are provided to assist in the explanation of the apparatuses, devices, systems, and methods described herein. None of the features or components shown in the drawings or discussed below should be taken as mandatory for any specific implementation of any of these the apparatuses, devices, systems, or methods unless specifically designated as mandatory. For ease of reading and clarity, certain components, modules, or methods may be described solely in connection with a specific figure. In this disclosure, any identification of specific techniques, arrangements, etc. are either related to a specific example presented or are merely a general description of such a technique, arrangement, etc. Identifications of specific details or examples are not intended to be, and should not be, construed as mandatory or limiting unless specifically designated as such. Any failure to specifically describe a combination or sub-combination of components should not be understood as an indication that any combination or sub-combination is not possible. It will be appreciated that modifications to disclosed and described examples, arrangements, configurations, components, elements, apparatuses, devices, systems, methods, etc. can be made and may be desired for a specific application. Also, for any methods described, regardless of whether the method is described in conjunction with a flow diagram, it should be understood that unless otherwise specified or required by context, any explicit or implicit ordering of steps performed in the execution of a method does not imply that those steps must be performed in the order presented but instead may be performed in a different order or in parallel. Steps may be repeated, added to, or deleted from, any method described herein.

Throughout this disclosure, references to components or modules generally refer to items that logically can be grouped together to perform a function or group of related functions. Like reference numerals are generally intended to refer to the same or similar components. Components and modules can be implemented in software, hardware, or a combination of software and hardware. The term "software" is used expansively to include not only executable code, for example machine-executable or machine-interpretable instructions, but also data structures, data stores and computing instructions stored in any suitable electronic format, including firmware, and embedded software. The terms "information" and "data" are used expansively and includes a wide variety of electronic information, including executable code; content such as text, video data, and audio data, among others; and various codes or flags. The terms "information," "data," and "content" are sometimes used interchangeably when permitted by context.

It is intended that the specification and examples be considered as exemplary only, with a true scope and spirit of the disclosure being indicated by the following claims.

What is claimed is:

1. A method of generating a joint application for a first applicant and a second applicant, comprising:
   testing, via one or more processors, a first permutation of aggregating a first model score and a second model score, wherein the first model score is associated with the first applicant, and the second model score is associated with the second applicant;
   generating, via the one or more processors, a risk model for the first and second applicants;
   determining, via the one or more processors, a second permutation of aggregating the first model score and the second model score based on the risk model;
   testing, via the one or more processors, the second permutation of aggregating the first model score and the second model score;
   selecting, via the one or more processors based on the testing of the first permutation and the testing of the second permutation, one or both of the first permutation and the second permutation;
   aggregating, via the one or more processors in response to the selecting, the first model score and the second model score to generate a joint model score for the first and second applicants using the selected one or both of the first permutation and the second permutation, wherein the aggregating includes: (1) determining that the first model score is higher than or equal to the second model score and (2) selecting the first model score or the second model score as the joint model score for the first and second applicants;
   generating, via the one or more processors, the joint application for the first and second applicants at least based on the joint model score;
   segmenting, via the one or more processors based on the joint model score and a predetermined segmentation policy, the joint application into one of a plurality of predetermined segments; and
   generating, via the one or more processors based on both of the joint model score and the predetermined segment, a deal structure corresponding to the joint application.

2. The method of claim 1, wherein the first permutation of aggregating the first model score and the second model score comprises:
   receiving an address of the first applicant;
   receiving an address of the second applicant; and
   determining that the address of the first applicant and the address of the second applicant are the same.

3. The method of claim 2, wherein the first permutation of aggregating the first model score and the second model score further comprises:
   aggregating the first model score and the second model score to generate the joint model score based on a determination that the first applicant address and the second applicant address are the same.

4. The method of claim 1, wherein testing the first permutation of aggregating the first model score and the second model score is based on at least one of: a credit analysis of the first permutation, or a market demand for the first permutation.

5. The method of claim 1, further comprising:
   testing a third permutation of aggregating the first model score and the second model score; and
   comparing the first permutation and the third permutation, wherein the comparing comprises (i) comparing a credit analysis of the first permutation and a credit analysis of the third permutation and/or (ii) comparing a market demand for the first permutation and a market demand for the third permutation.

6. The method of claim 5, further comprising:
   aggregating the first model score and the second model score to generate the joint model score for the first and second applicants based on the first permutation, the second permutation, the third permutation, or any combination of the first, second, and third permutations.

7. The method of claim 1, wherein the first risk model is generated at least based on a credit score of the first applicant and a credit score of the second applicant.

8. A method of generating a joint application for a first applicant and a second applicant, comprising:
   obtaining, via one or more processors, a first model score associated with the first applicant;
   receiving, via the one or more processors, an address of the first applicant;
   obtaining, via the one or more processors, a second model score associated with the second applicant;
   receiving, via the one or more processors, an address of the second applicant;
   determining, via the one or more processors, that the address of the first applicant and the address of the second applicant are the same;
   selecting, via the one or more processors, in response to a determination that the address of the first applicant and the address of the second applicant are the same, one or more of a plurality of permutations of aggregating;
   aggregating, via the one or more processors, the first model score and the second model score to generate a joint model score for the first and second applicants using the selected one or more of a plurality of permutations of aggregating, wherein the aggregating includes: (1) determining that the first model score is higher than or equal to the second model score and (2) selecting the first model score or the second model score as the joint model score for the first and second applicants;

generating, via the one or more processors, the joint application for the first and second applicants at least based on the joint model score;

segmenting, via the one or more processors based on the joint model score and a predetermined segmentation policy, the joint application into one of a plurality of predetermined segments; and generating, via the one or more processors based on both of the joint model score and the predetermined segment, a deal structure corresponding to the joint application.

9. The method of claim 8, wherein the first model score comprises a first credit score, a first income score, and/or a first predetermined score associated with the first applicant, and wherein the second model score comprises a second credit score, a second income score, and/or a second predetermined score associated with the second applicant.

10. The method of claim 9, wherein obtaining the first model score associated with the first applicant comprises:

receiving, from the first applicant, the first credit score, the first income score, and/or the first predetermined score associated with the first applicant; and generating the first model score based on the received first credit score, first income score, and/or first predetermined score.

11. The method of claim 10, wherein obtaining the second model score associated with the second applicant comprises:

receiving, from the second applicant, the second credit score, the second income score, and/or the second predetermined score associated with the second applicant; and generating the second model score based on the received second credit score, second income score, and/or second predetermined score.

12. The method of claim 8, further comprising:

determining a joint credit policy for the first and second applicants at least based on the joint model score.

13. The method of claim 12, further comprising:

determining an outcome for the joint application at least based on the joint credit policy and/or the joint model score.

14. The method of claim 13, wherein determining the outcome for the joint application comprises at least one of: approving the joint application, declining the joint application, segmentation of the joint application, structuring a deal for the joint application, determining a price for the joint application, or stipulation of the joint application.

15. A method of generating a joint application for a first applicant and a second applicant, comprising:

obtaining, via one or more processors, a first model score associated with the first applicant, wherein the first model score comprises a first credit score, a first income score, and/or a first predetermined score associated with the first applicant;

receiving, via the one or more processors, an address of the first applicant;

obtaining, via the one or more processors, a second model score associated with the second applicant, wherein the second model score comprises a second credit score, a second income score, and/or a second predetermined score associated with the second applicant;

receiving, via the one or more processors, an address of the second applicant;

determining, via the one or more processors, that the address of the first applicant and the address of the second applicant are the same;

selecting, via the one or more processors, in response to a determination that the address of the first applicant and the address of the second applicant are the same, one or more of a plurality of permutations of aggregating;

aggregating, via the one or more processors, the first model score and the second model score to generate a joint model score for the first and second applicants using the selected one or more of a plurality of permutations of aggregating, wherein the aggregating includes: (1) determining that the first model score is higher than or equal to the second model score and (2) selecting the first model score or the second model score as the joint model score for the first and second applicants;

generating, via the one or more processors, the joint application for the first and second applicants at least based on the joint model score;

segmenting, via the one or more processors based on the joint model score and a predetermined segmentation policy, the joint application into one of a plurality of predetermined segments; and generating, via the one or more processors based on both of the joint model score and the predetermined segment, a deal structure corresponding to the joint application.

* * * * *